April 28, 1970

TAKESHI HASHIMURA

TIMEPIECE DRIVE 3,509,437

Filed Sept. 8, 1966

8 Sheets-Sheet 2

FIG. 7
CONVENTIONAL
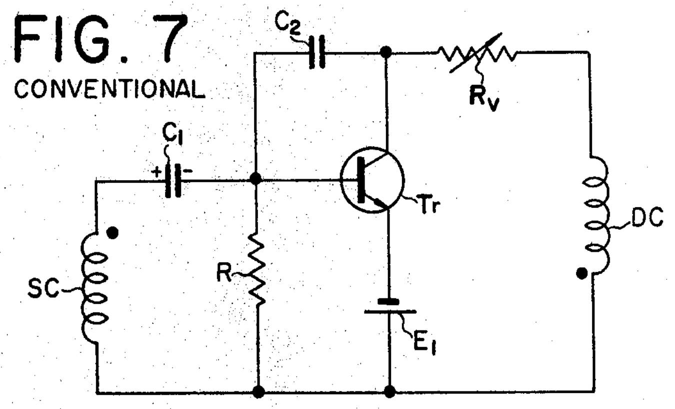

April 28, 1970 TAKESHI HASHIMURA 3,509,437

TIMEPIECE DRIVE

Filed Sept. 8, 1966 8 Sheets-Sheet 7

April 28, 1970 TAKESHI HASHIMURA 3,509,437

TIMEPIECE DRIVE

Filed Sept. 8, 1966 8 Sheets-Sheet 8

United States Patent Office 3,509,437

Patented Apr. 28, 1970

3,509,437

TIMEPIECE DRIVE

Takeshi Hashimura, Tokorozawa-shi, Japan, assignor to Citizen Tokei Kabushiki Kaisha, Tokyo, Japan Filed Sept. 8, 1966, Ser. No. 578,029

Int. Cl. H02k *33/18*

U.S. Cl. 318—129 2 Claims

ABSTRACT OF THE DISCLOSURE

A system for driving the mechanical vibrator of a timepiece with a free-running multivibrator. The mechanical vibrator controls the frequency of the multivibrator, and the multivibrator furnishes energy to drive the mechanical vibrator. Variable resistors in the multivibrator control the magnitude of the mechanical vibrations.

BACKGROUND OF THE INVENTION

Field of the invention

This invention relates to improvements in and relating to a timepiece electrice drive comprising an electronic drive circuit, especially for small timepieces such as witches, clocks and the like.

DESCRIPTION OF THE PRIOR ART

Prior art electric drive systems for timpieces, comprising at least a permanent magnet fixedly mounted either on a mechanical vibrator or rotary member, a pair of search or control and drive coils and an electronic amplifier electrically connected respectively to the input and output of the vibrator for driving the vibrator or the like as a time base have been known for a long time.

When now considering the induced voltages in the coils, there are two main representative modes, one of which is characterized by a continuous sinusoidal voltage form, while the other operates with interrupted and predominant voltage waves having a precisely or substantially predetermined period.

In the first mode of the two, the timepiece drive delivers a drive effort once during each period, thereby representing a larger driving angle or, when expressed in terms of electric engineering, a longer conductive period, for each of the drive periods, and thus providing an inferior working efficiency on account of a correspondingly larger value of ineffective current components.

On the other hand, it should be noted that selection of smaller drive angle is a requisite requirement for stabilizing the drive periods.

In the second mode of drive aforementioned, it is not absolutely impossible to provide the driving effort twice during each working period. It is however a grave drawback inherent in the prior art mode of operation that it provides rather inferior working efficiency caused specifically by the interior shape of the output voltage from the coils. A further drawback in this mode results from inferior stability with temperature fluctuations and the like ambient changes.

It is a desirable feature of the electric drive of the above type to provide self-starting.

When considering the mode of operation of the drive circuit relative to the mechanical vibrator, there are two general modes. In the first mode the oscillation period of the circuit is selected to be equal to that of the mechanical vibrator, while in the second mode the oscillation period is selected to a different value from that of the vibrator. It is observed that in the first mode a relatively easy self-start can be realized, in addition to an accelerated growth of vibration during the initial period of the vibration, while in this case a grave drawback will be a resulting higher rate of current consumption. Also, in the second operating mode, a high rate of current consumption will be encountered when an easy and quick self-starting is desired, and there is grave difficulty caused by a retarded growth of vibration.

SUMMARY OF THE INVENTION

It is therefore an object of the present invention to provide an efficient electric and electronic drive of the above type for use on a timepiece capable of operating for an extendedly long period with use of a battery means of a limited capacity.

Another object is to provide a timepiece drive of the kind referred to above, capable of performing an easy and quick start with an economized current consumption rate.

Still another object is to provide a timepiece drive of the above kind, capable of providing the driving force substantially at the maximum amplitude of voltage induced in the search coil.

Still a further object is to provide a timepiece drive of the above kind, capable of providing the drive force twice during each period of oscillation and at a smallest possible drive angle so as to realize the smallest possible useless current component.

The further object is to provide a timepiece drive of the above kind, capable of performing the required driving operation at a highly stabilized condition.

In particular, the present timepiece drive provides a drive circuit comprising an astable (that is free-running) multivibrator. By this provision, the required easy self-start is reliably realized by utilizing the inherent ability of the multivibrator to be easily brought into synchronization with an outside periodical excitation. It can be therefore noted that according to the principle of the present invention the provision of the timepiece drive with a separate self-starter can be obviated completely.

It is further possible with use of the proposed technique to adopt a larger value of time constant, preferably an RC time constant, which feature is especially predominant when applying this invention to the balance-so-called wheel motor, because in this case currents of inferior efficency are inhibited from flowing through the drive motor. As will be described hereinafter more in detail, the drive force is applied twice per period, and thus the current conductive period for the delivery of the drive effort is of a possible minimum which has, in combination with the above nature, a highly favorable influence upon the current consumption. It will be further noted that the minimized current-conductive period as employed in the drive circuit not only improves the working efficiency, but also the stabilty of working of the drive according to the present invention, as ascertained by the Airy's theorem.

With use of the present drive, the drive frequency is increased, which means that the growth of oscillation is accelerated in the course of the self-starting period of the timepiece drive.

BRIEF DESCRIPTION OF THE DRAWINGS

These and further objects, features and advantages of the invention will become more clear as the description proceeds with reference to the accompanying drawings illustrative of several preferred embodiments of the invention set forth in no limiting sense thereof.

In the drawings:

FIG. 7 is the writing diagram of a comparative conventional drive circuit.

DESCRIPTION OF THE PREFERRED EMBODIMENTS

Figures 1, 12:
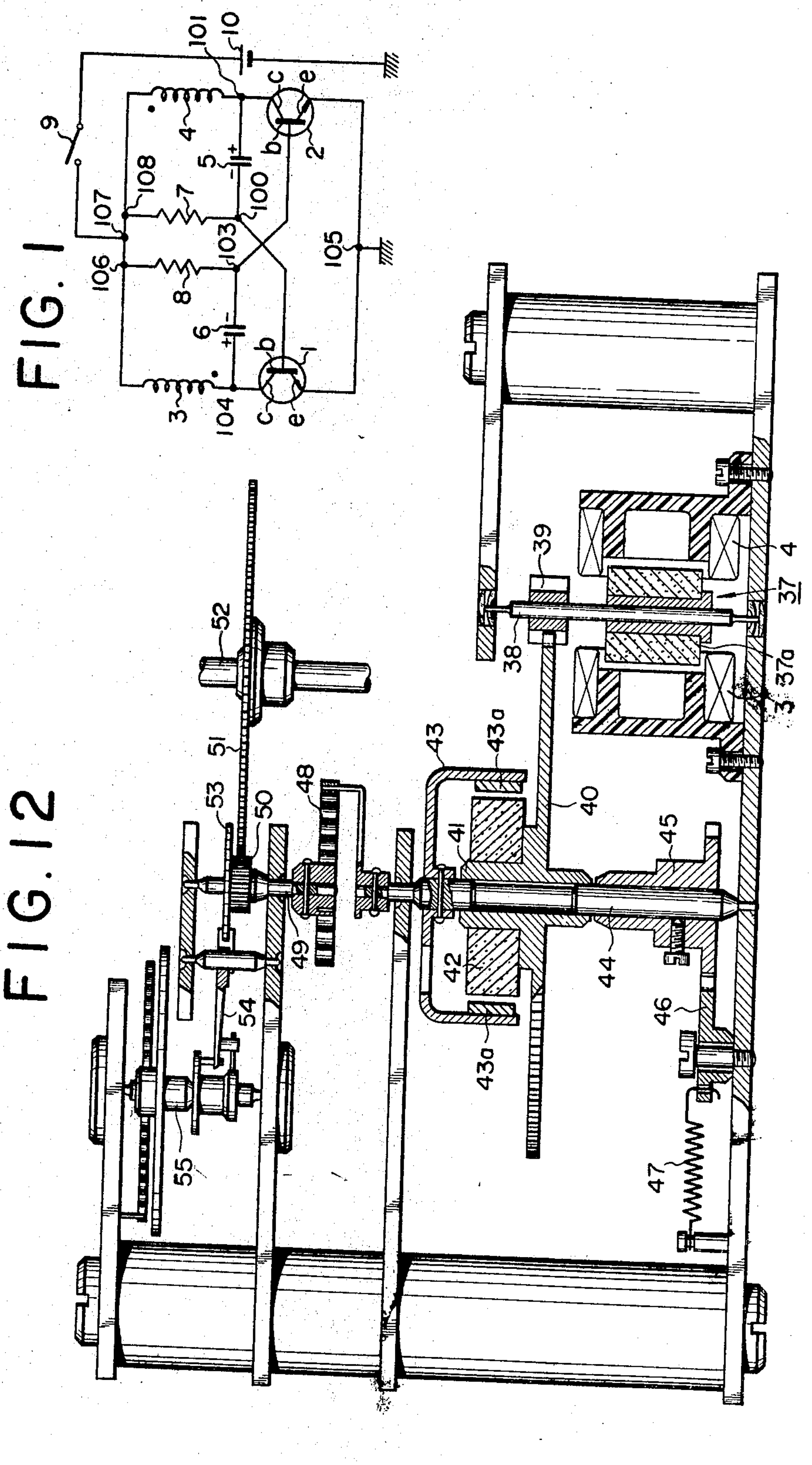
FIG. 1 is a connection diagram of a representative of a drive circuit which constitutes the main electronic constituent of the timepiece drive according to this invention.
FIG. 12 is a longitudinal section of a still further embodiment of the invention, comprising a small D.C. motor, a transmission mechanism and a conventional balance-wheel.
Figures 2, 3, 13:
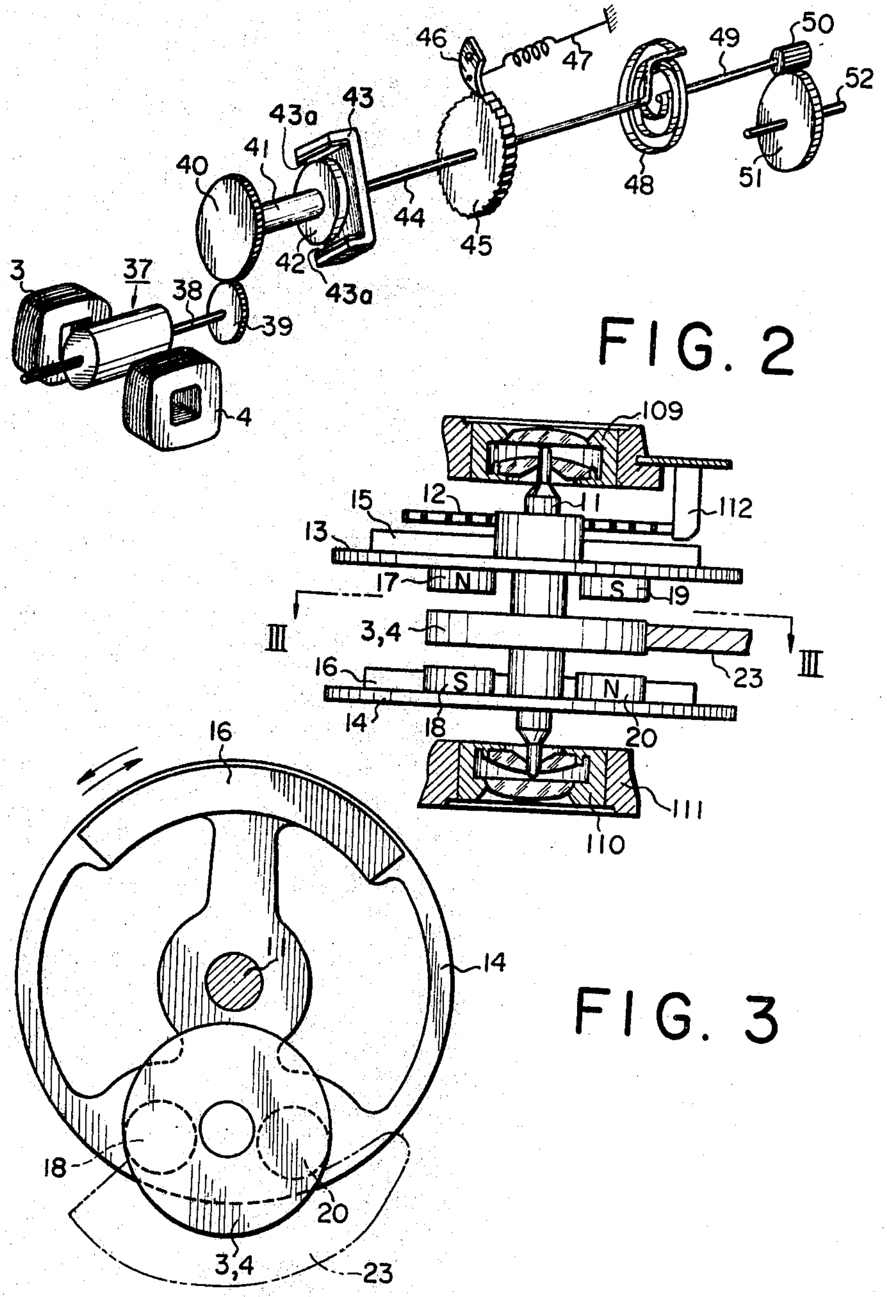
FIG. 2 is a partly sectional side view of essential working parts of a balance-wheel motor embodying the principle of the present invention.
FIG. 3 is a sectional view taken in a horizontal plane III—III in FIG. 2.
FIG. 13 is an exploded perspective view of several main constitutents of the mechanism shown in FIG. 12.

Now referring to the accompanying drawings, especially FIG. 1 thereof, numerals 1 and 2 represents a pair of transistors. The base electrode of the first transistor 1 is electrically connected through junction 100, condenser 5 and further junction 101 to the collector electrode of the second transistor 2. In the similar way, the base electrode of the second transistor 2 is electrically connected through junction 103, condenser 6 and further junction 104 to the collector electrode of the first transistor 1. The emitter electrode of the first transistor 1 is connected through junction 105, which is electrically connected to the frame as shown, to the emitter electrode of the second transistor 2. Junction 104 is connected through coil 3 and junction 106 to further junction 107, the latter being connected through junction 108 and coil 4 to junction 101. Biasing resistor 7 is inserted between two junctions 100 and 108. In the similar way, biasing resistor 8 is inserted between junctions 103 and 106. Coils 3 and 4 are wound in counter phase to each other, and preferably in the shape of a unified disc as shown in FIGS. 2 and 3. Junction 107 is electrically connected through manual switch 9 to the positive pole of a battery 10, the negative pole of which is earthed to the frame, as shown.

Next, referring to FIG. 2 there is shown a balance-wheel motor which comprises a shaft 11 rotatably mounted with its extreme ends in bearings 109 and 110, the shaft 11 mounts in turn a balance-wheel discs 13 and 14 fixedly thereon and pairs of permanent magnets 17, 18, 19, 20 in the form of rigid cylinders arranged in physically opposing relation to each other. These discs 13 and 14 are kept in parallel relation to each other at a predetermined mutual distance and made generally of a soft magnetic material, while the permanent magnets 17–20 are made of a hard magnetic material such as ferrite.

On the rim of the upper wheel disc 13, there is fixedly mounted a counter balance weight 15, and in the similar way a balance weight mass 16 is fixedly mounted on the rim of the lower wheel disc 14.

As easily supposed from the foregoing a magnetic closed circuit will be establish through 17, 18, 14, 20, 19, 13 and again 17. For this purpose, magnets 17 and 18 are arranged to have opposite magnetic poles, which arrangement applies equally to another pair of permanent magnets 19 and 20, therefore, dense magnetic fluxes are led to pass through the air-gap formed between the magnet pair 17, 18 or 19, 20, respectively.

The disc-shaped coil assembly 3, 4, hereinafter called briefly "coil disc" is fixedly mounted on supporting arm 23 which is in turn rigidly mounted on a conventional pillar plate 111, only partly shown, of a timepiece to which the invention is applied, said coil disc being arranged off-center of the balance-wheel shaft 11 so as not to interfere with the oscillatory movement of the balance-wheel, and at a proper level so as to pass through the air-gaps between the pairs of permanent magnets 17, 18 and 19, 20.

The number of coil windings at 3 is selected to be equal to that of another coil element at 4. The coil disc can be preferably wound up by threading two insulated copper wires simultaneously, and is preferably attached to the support arm 23 by means of any conventional sticking agent.

One end of hair spring 12 is fixedly attached to the shaft 11, while the opposite end of the spring is mounted on a conventional stud 112.

As is conventional, the hair spring urges the balance wheel toward its neutral condition and serves for the required speed-regulating purpose. The permanent magnets and the coil disc are so arranged relative to each other that the cross linkage of magnetic fluxes is kept in optimum condition when the balance-wheel occupies its neutral position.

The operation of the device so far described will be described in the following with reference to FIG. 4 which illustrates additionally a conventional lever and escapement arrangement.

When the balance-wheel motor is caused to operate in the conventional manner, the oscillatory movement of the balance-wheel is transmitted to the lever 24, thence to the escapement wheel at 25, which is thus caused to rotate in a predetermined direction in a stepping mode. Rotation is transmitted from the escapement through its shaft **25*a* to a pinion 26** fixedly attached thereto. The drive movement is further transmitted from this pinion to a conventional gear train, not shown, of the timepiece, so as to rotate conventional time-indicating hands, again not shown.

In the shown mechanism, the driving torque is derived from the oscillatory balance-wheel, and thus the torque-transmitting direction is contrary to that regularly employed for conventional mechanical movements of timepieces. Therefore, this type of driving mode, in general, is called "the reversed type of escapement mechanism," by those skilled in the art.

Figure 4:
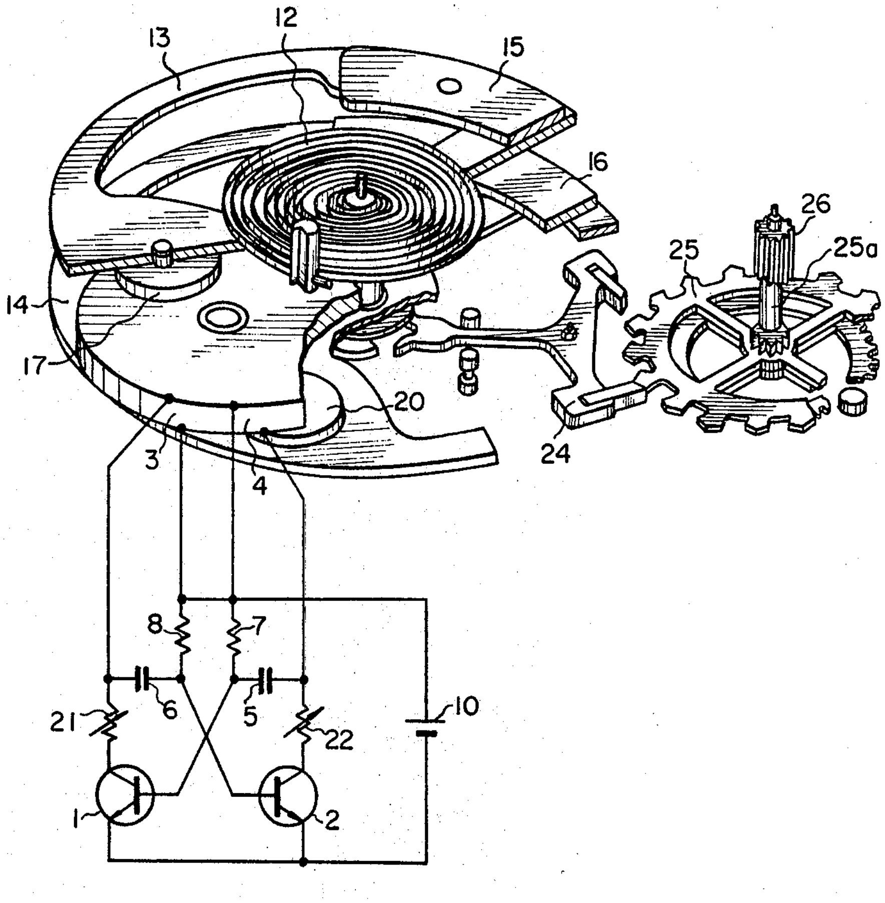
FIG. 4 is a perspective view, partially broken away, of the balance-wheel motor, wherein however an anchor lever and an escapement cooperating with the motor and the drive circuit shown in FIG. 1 are also shown for better understanding.

The drive circuit shown in FIG. 4 is substantially same as that shown in FIG. 1. There is however a slight difference from the foregoing in that provision is made for adjustable resistors 21 and 22 to be inserted in the collector paths of the transistors 1 and 2, respectively, for manually adjusting the oscillating angle of the balance-wheel. The variable resistors 21 and 22 are inserted in the collector passages connecting to the junction of the condensers and the drive coils. It will be appreciated that the adjustable resistors are not included in the circuit loops affecting the bias level of the transistors. Since the collector or drive current voltage drop at the terminal end of the adjustable resistor resulting from the flow of collector or drive current therethrough does not affect the level of bias voltage, the adjustable resistors thus are related only to the magnitude of collector current. The amplitude of oscillation of the balance-wheel is thus varied by adjusting the resistance of resistors 21 and 22. These variable resistors may be omitted from the initial discussion of the device, since these elements do not influence the basic working nature of the present timepiece drive.

Transistors 1 and 2 may be epitaxial planar silicon transistors of NPN-type, and the base, collector and emitter electrode may be denoted *b, c,* and *e*, respectively, for proper identification.

Since coil elements 3 and 4 are wound in the opposed phase, voltages induced therein by the oscillatory movement of the balance-wheel, carrying thereon permanent magnets 17–20 adapted for electromagnetically cooperating with said coil elements, will have opposite senses to each other. The collector electrodes of two transistors 1 and 2 are connected through condensers 5 and 6, respectively, to the base electrode of the other transistor, already referred to, in what could be called the A.C.-mode. At the same time, these condensers 5 and 6 serve to establish respective time constant circuits, in cooperation with resistors 7 and 8, respectively, as will be described more in detail hereinafter.

When the balance-wheel motor is caused to oscillate, for instance in FIGS. 2 and 3, voltages will be induced by the alteration in relative position between the coil elements 3 and 4 and the magnets 17–20. When this voltage-inducing mechanism is considered more precisely, and when the balance-wheel is assumed to be rotated in the clockwise direction by occupying successively three different positions shown in FIGURE *5a* (1 and 2), *5b* (1 and 2), and *5c* (1 and 2), the induced voltage can be calculated by the following formula:

$$e=BNlv$$

where:

B: magnetic flux density from the magnet, wb./m.$^2$:
N: number of effective windings of the coil:
*l*: effective length of the coil, m.:
*v*: relative velocity of the magnet, m./sec.:

Since the induced voltage is proportional to the magnetic cross linkage, no voltage will be induced if there is no cross linking on account of non-overlapping condition between coil and magnet. When comparing FIGURES *5a, 5b,* and *5c* (1 and 2) with FIGURE *5d*, it can be observed that in the stage shown in FIGURE *5b* (1 and 2), the cross linkage will be the maximum and the moving velocity of the balance wheel will be also the maximum whereby the induced voltage becomes maximum.

At the each of both extreme relative positions, as shown in FIGURES *5a* (1 and 2) and *5c* (1 and 2) the cross linkage will become substantially a half of the maximum value as shown in FIGURE *5b* (1 and 2) so that the induced voltage will be lowered correspondingly. It will be observed from FIGURE *5e* (1 and 2) that the polarity of the induced voltage will be reversed at these extreme relative positions from that obtained at the central position of FIGURE *5b* (1 and 2).

The induced voltage will be in the form of interrupted pulse groups having peaks K, L and M or K′, L′ and M′, as schematically illustrated in FIGURES *5e*-1 and *5e*-2.

Now assuming in FIG. 1, that coils 3 and 4 be replaced respectively by resistors, the shown circuit will represent an astable multivibrator of known type and the oscillation period can be determined, respectively, by the product of capacitance at 5 or 6, multiplied by resistance value at 7 or 8, or more specifically the time constant. In the present invention, the time constant of the circuit is selected to a considerably higher value than the oscillation period of the balance-wheel. As an example, when the oscillation period is 0.4 second, the constant will amount to as high as 47 seconds. This measure serves to keep the oscillation period of the balance-wheel practically uninfluenced by the time constant of the drive circuit.

When power switch 9 is closed, the battery 10 having a certain voltage level E is connected electrically in circuit. Therefore, a substantial part of the battery current will flow through resistor 7 or 8, while a slight amount of the current willflow through coil 3 or 4 and condenser 5 or 6 to the base electrode of transistor 1 or 2, respectively. Which one of the transistors is actuated depends upon minor and occasional difference in the operating data of the both transistors. But, this will provide no influence upon the desired function of the timepiece drive according to the invention.

Now considering the first half cycle at the commencement of oscillation of the balance-wheel, during which time interval the balance-wheel is subjected to a driving effort in one direction or another, the aforementioned substantial current part is fed to one of the transistors, say 2, for making the same conductive. A change of state will be induced rapidly in the other transistor 1 because of the so-called regenerating action of the multivibrator, thereby the latter transistor being turned to its off-position.

At this moment, a drive current flows through the other coil 4 and a drive effort proportional thereto is exerted upon the balance-wheel which is thus urged to move correspondingly in the said direction. Thereby a voltage in proportion to this shifting travel *a* of the balance-wheel is induced in the mating coils at 3 and 4. The induced voltages in the both coils 3 and 4 are in opposite phase to each other, thus representing a 180°-phase difference from each other. Since, at this moment, the transistor 1 is kept in its interrupted condition, the collector voltage $e_{c1}$ amounts substantially to the battery voltage E added with the aforementioned induced voltage. In the course of this conducting condition of transistor 2, condenser 5 is charged with electrical potential having the polarity shown in FIG. 1. In the next succeeding half cycle, the balance-wheel will be urged to move in the reverse direction, and thus, the induced voltages will represent the opposite polarity to the induced one shown and described so far.

Figure 6:
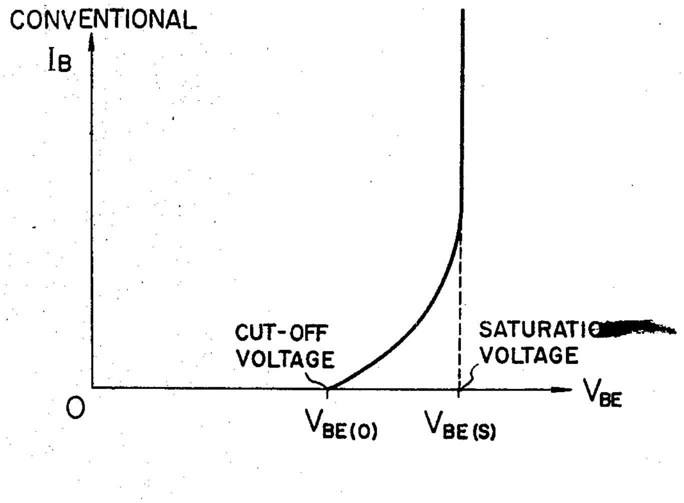
FIG. 6 is a representative characteristic curve of a transistor wherein the base current has been plotted against the base-emitter voltage.

The induced voltage in the coil 4 is led to pass through condenser 5 to the base electrode of transistor 1 for a certain period so as to keep this electrode in its positively energized condition. When this base electrode is in its positively energized condition, the base electrode voltage overcomes the cut-off voltage, $V_{BE(O)}$ (see, FIG. 6), the transistor 1 will be turned "on," thereby a drive current flowing through coil 3 which will act upon the balance-wheel so as to increase the deviation thereof.

At the same time, the base electrode of transistor 2 is negatively energized under the influence of the electrical charge previously accumulated in condenser 6 and thus instantly interrupted to its off-condition. Naturally, in this case, condenser 5 is charged. Therefore, it will be noted from the foregoing that the drive circuit will be caused to oscillate in accordance with the natural frequency of the balance-wheel in effect, which performance is a predominant operational feature of the present invention.

In this way, two transistors 1 and 2 will perform alternatively on-off operation, and the driving effort is exerted upon the balance-wheel twice per each period of oscillation. On account of the known nature of the multivibrator, in combination with more numerous chances of exertion of the driving force to the balance-wheel in this embodiment of the invention, the oscillatory movement of the wheel is accelerated in an abrupt manner and will be brought soon into its stabilized condition. Therefore, it can be said that the drive circuit performs its switching operation in a forcibly induced manner by the oscillation period of the balance wheel, whereby an easy, quick and reliable self-starting operation of the whole assembly is realized in a highly positive manner.

Figure 8A:
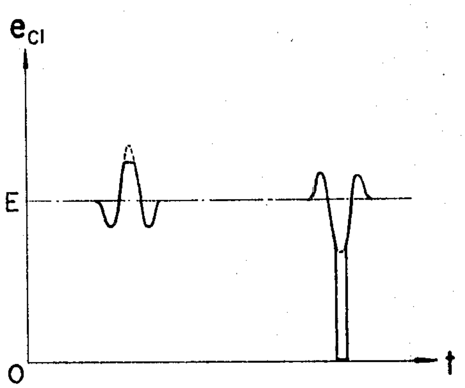
FIG. 8 is a plurality of voltage and current waves as appearing in two transistors shown in FIGS. 1 and 4.
Figure 8D:
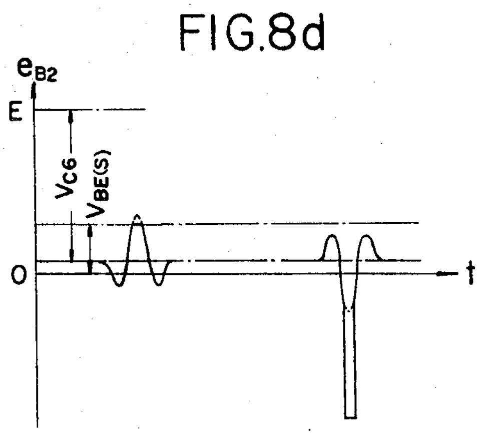
Figures 8B, 8C:
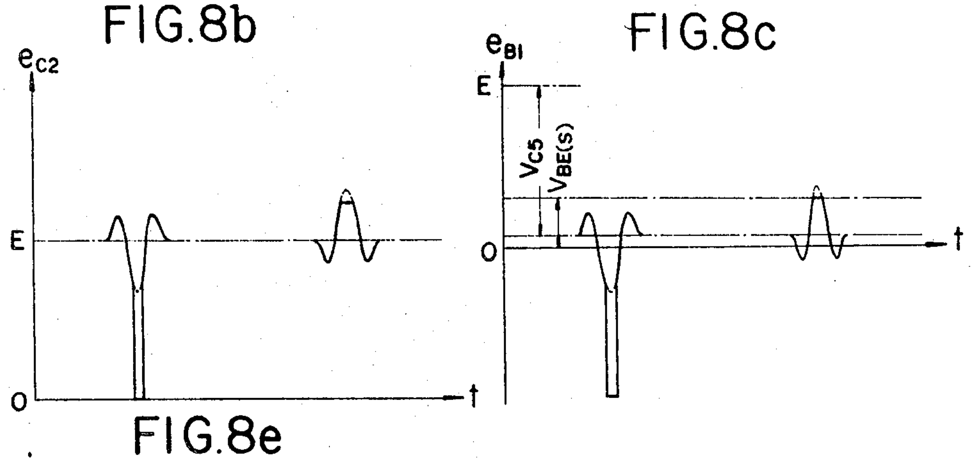
Figure 8E:
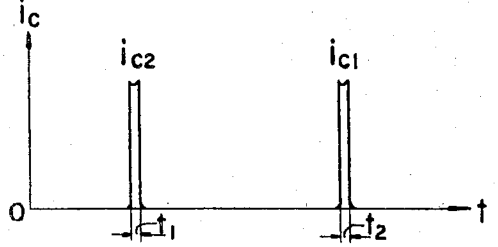
Figure 8F:
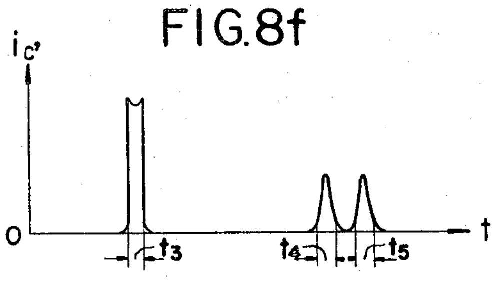

In FIG. *8a–8e*, several voltage waves are shown, as appear in the course of the aforementioned stabilized operating condition of the whole assembly. In FIGURES 8*a* and 8*b*, the collector voltages $e_{C1}$, and $e_{C2}$ of transistors 1 and 2, are shown, respectively, while in FIGURES 8*c* and 8*d*, the base voltages $e_{B1}$ and $e_{B2}$ of these transistors are shown, respectively. In FIGURE 8*e*, the collector current wave is shown. In comparison therewith, a representative collector current wave as appearing at a transistor of a conventional comparative drive circuit in shown in FIGURE 8*f*.

The base voltage of each of the transistors is biased in the negative sense under the influence of D.C. voltage (mean value $V_{C5}$ or $V_{C6}$ appearing at respective condenser 5 or 6, and is properly and automatically limited to be available when the respective transistor is to be actuated. More specifically, when the base voltage reaches a specific cut-off voltage, $V_{BE(o)}$, a base current will start to flow, thereby a collector current being also caused to flow. When the voltage reaches a saturation voltage, $V_{BE(s)}$, the collector current of the form as schematically shown in FIGURE 8*e* will begin to flow through the related coil, whereby the balance-wheel is driven for the desired purpose.

The drive current will flow twice per oscillation period, as schematically illustrated in FIG. 8*e*, the flowing time intervals thereof being shown therein by $t_1$ and $t_2$, respectively. These conductive time periods are very short. It will be further noted that the driving effort is exerted to the balance-wheel when the oscillation speed thereof is at its highest value, whereby the drive force is utilized in a highly efficient manner.

Generally speaking, with use of the conventional oscillating drive circuit, it is acknowledged that at a remote point from the center of the drive angle, the useless current component will be correspondingly increased which means a corresponding loss of the working efficiency.

In any of the conventional drive circuits, the time constant could not have been selected to a larger value, in consideration of the thereby adversely affected starting performance and the like, and thus, the reverse bias voltage for the transistor base electrode was insufficient for the desired optimum performance or at least subjected to a considerable variation. Therefore, the drive current appearing in the conventional circuit arrangement will generally take the form schematically and representatively illustrated in FIG. 8*f*, wherein at $t_3$, $t_4$ and $t_5$, the drive current will be also caused to flow. But, the current flow at these time points may be carried into effect, only in an inferior manner, when considering the aforementioned useless components. In addition, the reverse bias voltage at these time points is very unstable under the influence of temperature and other ambient conditions. As ascertained by intensive experimentation, the current passages at these specific inferior time points $t_4$ and $t_5$ are highly unstable which observation also applies to the drive force to be exerted upon the balance-wheel.

On the contrary, with use of the timpiece drive embodying the principle of the present invention, the time constant can be selected without difficulty as a considerably larger value than that commonly expected by those skilled in the art, thereby attaining a correspondingly larger value of the reverse bias voltage, yet accompanying least alteration thereof, the collector or drive current will flow as shown schematically in FIG. 8*e*, wherein, as will be clearly observed, the overall driving effort during each working period has been divided in two, providing, in addition, only a small drive angle.

Additionally, by adjusting the variable resistors 21 and 22, the collector current can be modified so as to meet occasional demands for the correction of the oscillation angle of the balance-wheel.

For carrying out a comparative test, with use of the inventive and conventional timepiece drive mechanisms shown in FIG. 4 and FIG. 7, respectively, the following design data were adopted:

Transistors: model, 2SC476, manufactured by Nippon Electric Company, Tokyo, NPN-type, epitaxial planar silicon transistor.

Coils: 3,000 turns, wire strength 12 microns, resistance value about 4.7 kilohms.

Condensers: microsolid tantalum condenser: 4.7 microfarads/ 6 v.

Resistors: miniature resistor element: 10 megohms.

Permanent magnets: platinum-cobalt alloy magnet: Br=6.400 gauss: Hc=5,100 oersteds: (BH) max.= $8.5\times10^6$G. oersteds: flux density at air gap=ca. 2,100 gauss.

Battery: silver battery: 1.5 volts: 100 milliampere-hours.

The drive mechanism is kept in operative condition for a timepiece gear train and the oscillation angle was 270 degrees. The adjusting resistor was set to about 1.5 kilohms. Then, the mean current consumption amounted to about 5 microamperes.

With use of the conventional drive circuit shown in FIG. 7, circuit data were selected as follows:

Resistor R—1.8 megohms.
Condenser $C_1$—2.2 microfarads/6v.

SC and DC denote seach coil and drive coil. E1 represents a battery. C2 represents a further condenser which serves for suppressing possible extraordinary oscillations and has no influence upon the basic operation of the drive circuit. T*r* represents a sole transistor, $R_V$ represents an adjusting resistor. In this circuit, other circuit data were selected to similar values as set forth above. The set values of adjusting resistor $R_V$ amounted to about 2.0 kilohms. Oscillation angle of balance-wheel amounted equally to 270 degrees. Under these operating conditions, the current consumption amounted as high as about 8.3 microamperes. The starting period amounted in this conventional arrangement 12 seconds, while the comparative time in the aforementioned inventive one was reduced to about 3.5 seconds. In these tests, the starting period was measured as that in which the oscillation angle of the balance-wheel increased from nil to 180 degrees.

In FIG. 9 several voltage and current wave forms are shown for the purpose of illustrating the starting performance of both the inventive and the conventional drivers shown and described in the foregoing, as ascertained by intensive practical comparative tests.

Figures 9A, 9B, 9C, 9D, 9E, 9F:
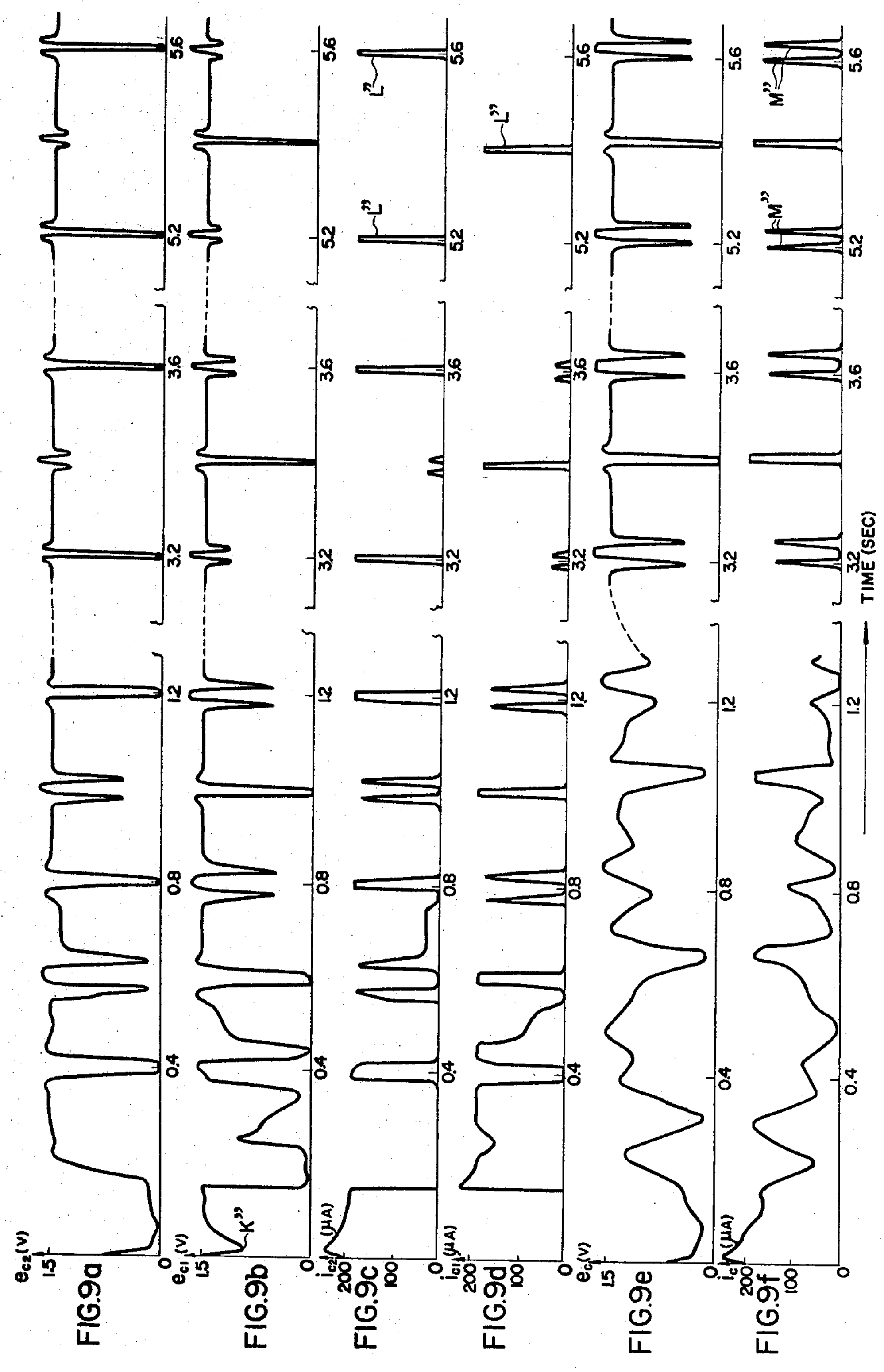
FIG. 9 is a chart showing several comparative voltages taken from practical test results, comparing the present invention with comparative prior art.

In this wave form chart, FIGURES 9*a* and 9*b* represent collector voltage $e_{C2}$ and $e_{C1}$ of transistors 2 and 1, respectively. FIGURES 9*c* and 9*d* represent collector currents $i_{C2}$ and $i_{C1}$ of transistors 2 and 1, respectively. FIGURES 9*e* and 9*f* represent the collector voltage $e_C$ and collector current $i_C$ of transistor T*r* fitted in the conventional drive.

With use of the embodiment of the invention so far shown and described, when the manual switch is closed, an instantaneous heavy drive current is caused to flow, as schematically shown in FIG. 9*c*, whereby the balance-wheel is driven with very heavy starting impulses at the very initial starting moment. The predominant induced voltage K″ is illustrated in FIGURE 9*b*.

From these comparative voltage and current wave forms, it can be easily ascertained that the drive circuit as employed in the inventive arrangement is automatically and heavily induced to the desired synchronization with the oscillation period of the balance-wheel and the thus synchronized oscillation thereof attains an amazingly quick and positive growth toward the stabilized regular oscillation within a highly short time interval.

As for the current flow periods, it will be noted from FIGURES 9*c* and 9*d* that sharply and well defined current pulses may be delivered to the balance-wheel from the drive circuit when the stabilized operation of the drive assembly has been realized within a short starting period.

On the contrary, when relying upon the conventional technique, as will be easily recognized from FIGURES 9*e* and 9*f*, the initial starting period in advance of the establishment of the stabilized operation represents a considerable retardation in comparison with the novel technique and the growth of oscillation is characterized by a slower tempo.

As for the current-delivery mode, there are a considerable number of inefficient current pulses as observed at "M" in the wave series of FIGURE 9*f* and when seen as a whole, the current flow time is very long in comparison with the case illustrative of the present novel technique.

Figures 1, 5A:
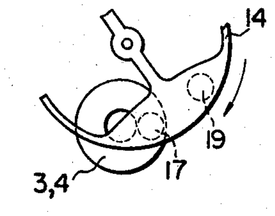
FIG. 5*a, b* and *c*, denotes several schematic views for the illustration of induced voltages and the like in three different relative positions of the balance-wheel magnets and the coil assembly, employed in the foregoing embodiment.
Figures 1, 5B:
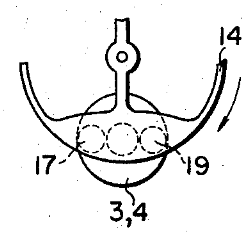
Figures 1, 5C:
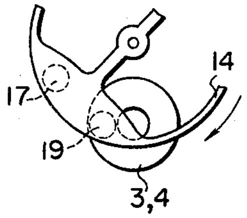
Figures 2, 5A:
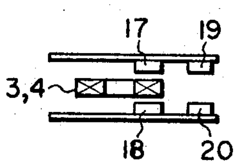
Figures 2, 5B:
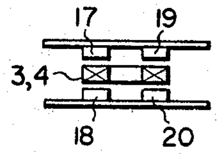
Figures 2, 5C:
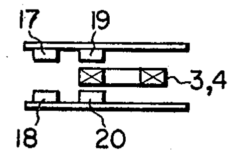
Figure 5D:
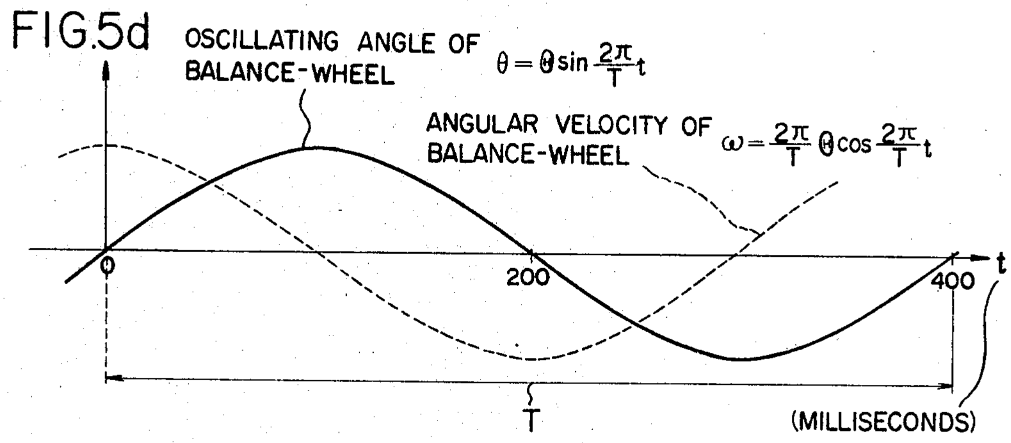
Figures 1, 5E:
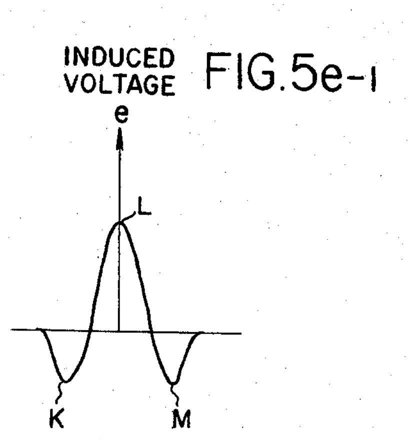
Figures 2, 5E:
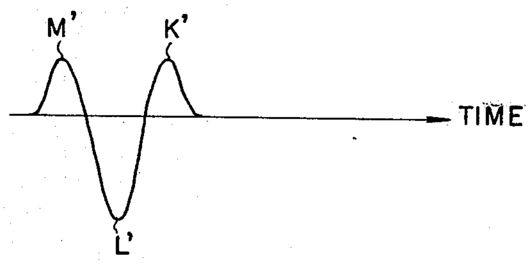

Additionally, in FIG. 5*e* (1 and 2) pulses denoted K, L and M correspond respectively to the operating stages shown in FIGURE 5*a* (1 and 2), 5*b* (1 and 2) and 5*c* (1 and 2) when the balance-wheel oscillates in one direction, for instance, in the clockwise direction. When the balance-wheel oscillates in the return stroke, the induced voltage will take the form shown with reference characters M', L' and K'.

For considering the rate of growth of oscillation at the starting moment of the driving mechanism of the above kind, the influence of the D.C. amplifying factor $h_{FE}$ of the transistor must be taken into account.

The following results were obtained from practical experiments for the determination of the period necessary for accelerating the oscillation angle from nil to 180 degrees.

| hFE | With novel circuit | With conventional circuit |
|---|---|---|
| 50 | 3.5 sec. | Non-starting |
| 100 | 3.5 sec. | 12 sec. |
| 200 | 3.0 sec. | 8 sec. |
| 400 | 2.0 sec. | 6.5 sec. |

Remarks: $h_{FE}$ was measured at $V_{CC}$=1.5 volts: $I_B$=0.5/$\mu$A: ambient temperatures: 25° C.

As seen from above, the conventional circuit is liable to be seriously affected by occasional values of $h_{FE}$. With smaller values of $h_{FE}$, the vibrator may frequently not start. According to the invention, such difficulty can be fully obviated.

When comparing with conventional vibrators, the novel circuit arrangement will provide a trebled growing speed of vibration at the initial starting period of the driver. In fact, however, the oscillating angle will amount to a lesser value than 90°, such as about 60–80 degrees, for the regular movement of the time-keeping mechanism of a timepiece, and therefore the necessary automatic starting period in the case of this invention can be still further reduced, for example to less than a second which is sufficient for practical purposes. Therefore, the timepiece embodying the principle of the present invention may dispense with the separate starter which is frequently of highly complicated design.

The principle of the present invention can be extended to the case wherein the induced voltage in the coil will take a form of continuous sinusoidal shape. As an example, this type of device can be embodied into a reversed escapement type driver as shown in FIGS. 10 and 11.

Figure 11:
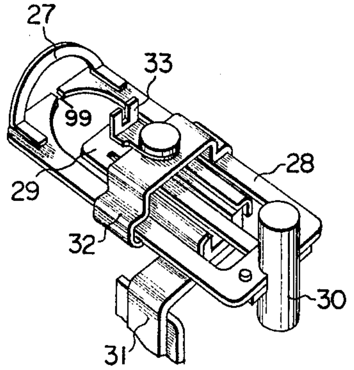
FIG. 11 is a perspective view of the vibrator shown in FIG. 10.

In this embodiment, a vibrator leaf 29 is attached at its one end fixedly with a bar magnet 30, said leaf having a substantial shape of an E and its central leg carrying the magnet as shown in FIG. 11, while the remaining both outer legs are attached at their ends fixedly onto a mounting arm at 31 which is fixed rigidly on a conventional pillar plate, not shown, of a timepiece such as a clock. The central leg of the E-shaped vibrator leaf carries a feed magnet 28 having substantially the shape of an elongated rectangular C formed with an air gap at 99. For avoiding any physical deformation at this air gap, a curved reinforcement 27 is attached to the free end of the feed magnet so as to bridge the air gap 99. Although the bearing means are not shown for simplicity, a magnetic wheel 34 made of a magnetic material into the physical shape of a conventional escapement wheel is rotatably mounted on the pillar plate and magnetically coupled by its outer tooth-like projections with the feed magnet 28 through the intermediary of said air gap.

Figure 10:
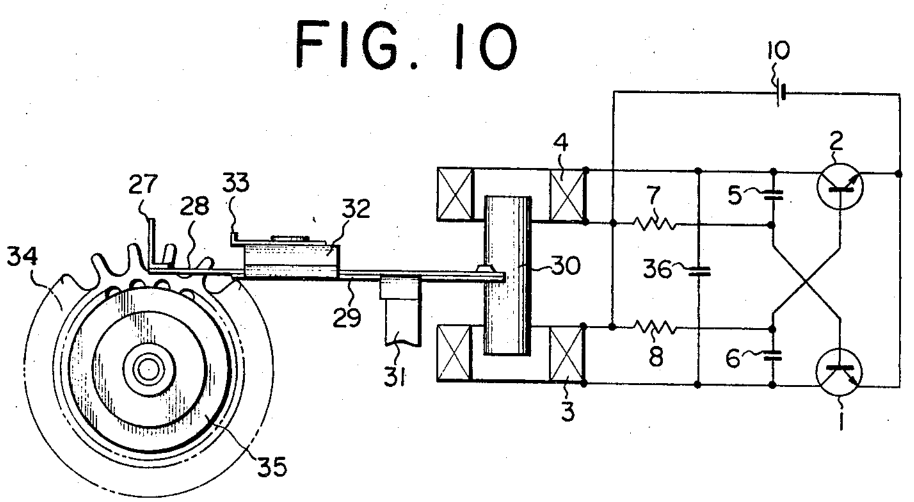
FIG. 10 is a schematic side elevation of a further embodiment of the present invention, comprising a mechanical vibrator, a reversed escapement wheel magnetically coupled therewith and a drive circuit for said vibrator, the latter being shown in the form of schematic wiring diagram.

When the vibrator leaf 29 is caused to oscillate under the influence of the periodic driving efforts provided by the electromagnetic cooperation of the bar magnet 30 with stationary coils 3 and 4 which are arranged in a drive circuit, shown at the right-hand side of FIG. 10 and comprising substantially similar constituents to those shown in FIG. 1, the magnetic wheel 34 is caused to rotate in a stepping manner through the intermediary of aforementioned magnetic coupling with the feed magnet 28 which is now kept in vibration. The stepping frequency of the wheel 34 is just the same as that of the vibrator assembly comprising the lead 29, the feed magnet 28 and the bar magnet 30. Rotation of the magnetic wheel 34 can be utilized through the intermediary of a conventional timepiece gear train, not shown, for driving conventional time-indicating hands, again not shown. In the drive circuit, there is additionally provided a condenser 36 which serves for suppressing occasionally developing extraordinary oscillation of the circuit. The numeral 35 denotes a conventional damper which is attached to the magnetic wheel 34, for keeping the rotational movement of the latter in a highly stabilized condition. Rough adjustment of the number of vibrations of the mechanical vibrator may be made to slidingly adjust the longitudinal position of an adjusting piece 32 which is slidably mounted on the feed magnet 38. There is provided an adjusting screw piece 33 having an eccentric mass and being adjustably mounted on the adjusting piece 32. When rotating this screw 33, fine adjustment of the number of vibrations of the mechanical vibrator can be brought into effect.

The capacitance of the additionally provided condenser 36 is selected to a considerably smaller value than that of condenser 5 or 6. Therefore, the provision of the condenser 36 does not influence the regular operation mode of the drive circuit.

In the present embodiment, electromagnetic coupling of bar magnet 30 with coils 3 and 4 is kept always maintained to a lesser or larger degree so that the induced voltage in either coil will take the form of a sinusoidal continuous wave.

The growth of vibration in the course of start of the oscillative operation of the whole assembly is also very quick in this case.

In FIGURES 15*a*–15*e*, several voltage and current wave forms appearing in the drive circuit when it is kept in its stabilized condition are schematically shown, wherein $e_{C1}$ and $e_{C2}$ represent collecter voltages of transistors 1 and 2; $e_{B1}$ and $e_{B2}$ represent the base voltages of these transistors.

When the time constant of the drive circuit shown in FIG. 10, as determined by the product of capacitance 5 and resistor 7 or that of capacitance 6 and resistor 8, is selected to a large enough value, it is possible to provide collector current in the form shown in FIGURE 8*e*. In this case also, the drive force in the course of an oscillating period is divided into two, and it is applied to the vibrator assembly at its maximum velocity point, so that the drive angle is made smallest as possible, thereby improving substantially the working efficiency and the stability in periodic operation, as was described hereinbefore. In comparison, a comparative current wave as met in the conventional drive circuit is shown at *f* in FIGURE 8.

Finally, referring to FIGS. 12–15, a still further embodiment of the present invention will be described in detail. This embodiment is made in the form of a small D.C. motor, arranged to wind-up a constant pressure spring.

Figure 14:
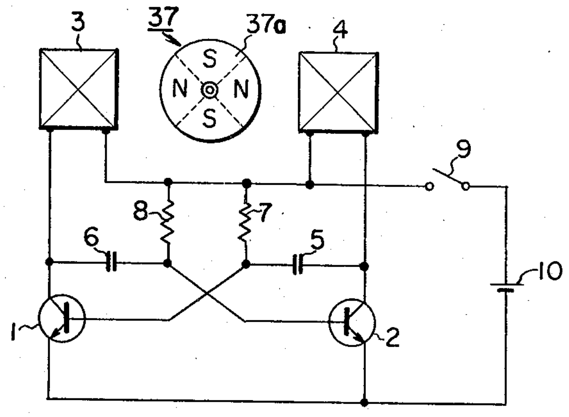
FIG. 14 is a wiring connection of the electric circuit adapted for cooperation with the D.C. motor shown in FIGS. 12 and 13.

In FIGS. 12–14, the small motor is comprised of coils 3 and 4 and a magnetic rotor 37 magnetically coupled therewith and carrying fixed thereon a cylindrical permanent magnet 37*a*. Rotor shaft 38 mounts thereon fixedly a pinion 39. When the rotor 37 is caused to rotate, motion is transmitted therefrom reducedly to a gear 40 kept meshing with the pinion 39 and formed with boss 41 which mounts, in turn fixedly, a permanent cylindrical magnet 42 of four pole design. A vertical shaft 44 passes rotatably through said gear boss 41 and mounts in turn fixedly a yoke 43 which carries thereon follower segments 43*a* made of magnetic material for constituting a magnetic coupling with the magnet 42. Shaft 44 mounts fixedly a winding pinion 45 which is adapted for winding up a constant-pressure spring 48. A pivotable pawl 46 is kept in pressure engagement with the teeth on the pinion 45 by means of an urging spring 47.

When the constant pressure spring is wound up a certain predetermined angle, say, corresponding to $1\pi$ radians, the magnetic coupling is caused to slip, but any reverse rotation of the pinion 45 is positively prevented by pawl 46.

On the other hand, escapement wheel 53 fixedly attached to shaft 49 is regulated in its rotational speed, through conventional anchor lever 54 from balance-wheel 55. Therefore, shaft 52 provided with gear 51 kept in meshing with pinion 50 made integral with the escapement 53 is driven at a regulated speed.

Therefore, in this case, the spring 48 is loosened and then the magnetic coupling will re-established as before, and then the constant pressure spring is rewound, and so on.

To complete the description, the spring 48 is fixedly connected by its one end with said shaft 49. The gear 51 constitutes a member of a timepiece gear train, not shown, thus the regulated rotation is transmitted therethrough to conventional time-indicating hands, again not shown.

As schematically illustrated in FIG. 14, the cylindrical magnet 37*a* of rotor 37 is magnetized so as to constitute a 4-pole magnet. Therefore, when the rotor performs a complete revolution, two induced voltage waves, having a period of $\pi$, in the coil 3 or 4 and of a continuous sinusoidal shape, as was hinted hereinbefore. By forming the rotor magnet 37*a* into the 4-pole model, the rotational period of the rotor will be a double of the period of the induced voltage.

Figure 15A:
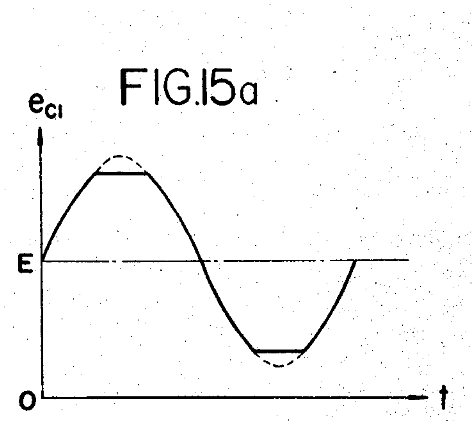
FIG. 15 is a chart showing several voltage waves appearing in several points in the circuit shown in FIG. 14.
Figure 15D:
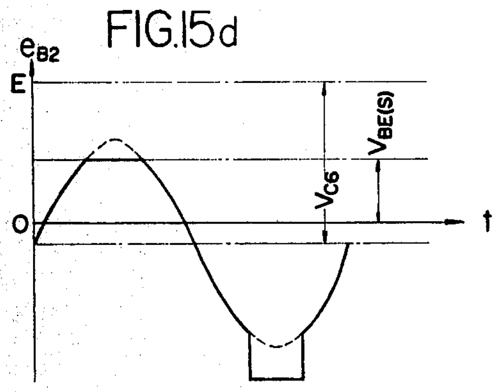
Figure 15B:
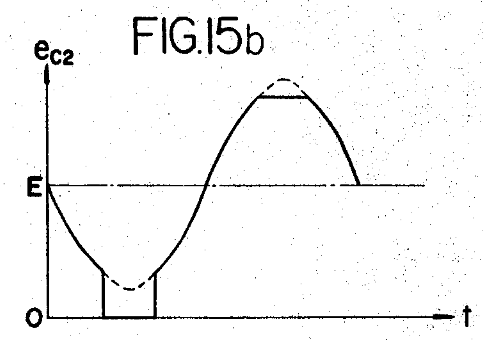
Figure 15C:
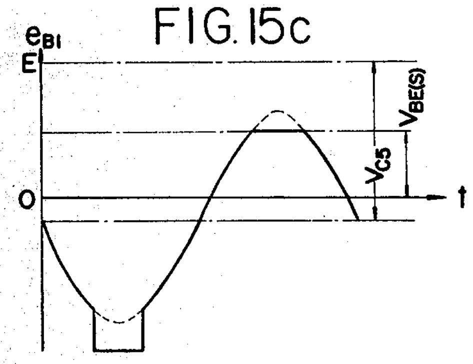
Figure 15E:
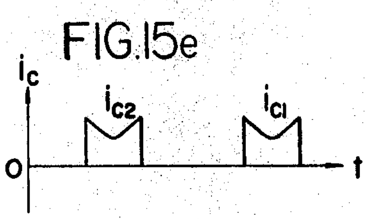

In FIG. 15*a*–(*e*), a plurality of voltage and current waves are shown. At *a* and *b*, collector voltages $e_{C1}$ and $e_{C2}$ of transistors 1 and 2 are illustrated, respectively. At *c* and *d*, base voltages $e_{B1}$ and $e_{B2}$ of these transistors are shown, respectively. At *e* in the same figure, collector current wave, $i_C$ of each of the transistors is shown. These wave forms are also those appearing under the stablized operating condition of the driving device.

In the present embodiment, also, the driving force is applied twice during each period of the induced voltage, and, indeed, at the point of maximum value of the voltage. Thus, the working efficiency of the device can be substantially increased in comparison with the case of conventional comparative motor.

It is to be understood that the above-described arrangements are illustrative of the application of the principles of the invention. Other arrangements may be devised by those skilled in the art without departing from the spirit and scope of the invention.

What is claimed is:

1. A timepiece drive system comprising (a) a mechanical vibrator having a natural frequency mechanical vibrator resonance for generating mechanical vibrations at a substantially constant frequency for mechanically timing the timepiece, (b) a free-running multivibrator drive circuit for providing energy to said mechanical vibrator used to generate said mechanical vibrations comprising:

(1) first and second like conductivity transistors having base, collector and emitter terminals, both of said transistors being normally biased to the nonconductive state, (2) a pair of condensers for coupling the collector terminal of each of said transistors to the base terminal of the other one of said transistors, (3) a source terminal for providing an electrical operating potential, (4) a pair of resistors for coupling the base terminal of each of said transistors to said source terminal, said pair of resistors and said pair of condensors defining an RC time constant which is considerably larger than the natural frequency period of said mechanical vibrator so that the natural frequency of oscillation of said multivibrator is substantially less than said natural frequency of mechanical vibrator resonance if said multivibrator were not influenced by said mechanical vibrator, (5) a pair of coils wound and arranged in opposite phase to each other, each of said coils being connected between said source terminal and a respective one of the collector terminals of said transistors, said coils acting as a load to said transistors, and (c) permanent magnet means mounted on said mechanical vibratir and magnetically coupled with said pair of coils and inducing a signal in each coil during each period of repeated movement of said mechanical vibrator to establish alternately in each transistor a brief period of conductivity which produces a brief drive pulse alternately in each coil to exert opposite magnetic driving forces on said permanent magnet means twice during each period of oscillation of said mechanical vibrator corresponding to each time said mechanical vibrator passes through its center of vibration which center of vibration corresponds to the rest position of said mechanical vibrator.

2. A timepiece drive as recited in claim 1 further comprising a pair of variable resistances respectively connected between the collector terminal of each of said transistors and the junction of the coil and the condenser associated with each of said transistors which permit the adjustment of the magnitude of mechanical vibrations by varying the resistance of said variable resistors to control the amplitude to control the amplitude of the drive pulses produced in said coils thereby affecting the amount of said energy provided to said mechanical vibrator.

References Cited

UNITED STATES PATENTS

| | | | |
|---|---|---|---|
| 3,277,314 | 10/1966 | Munoz. | |
| 3,333,172 | 7/1967 | Brailsford | 318—132 XR |
| 3,241,087 | 3/1966 | Gossel | 331—113 |
| 2,986,683 | 5/1961 | Lovet | 318—132 |
| 3,212,252 | 10/1965 | Nakai | 318—129 XR |
| 3,064,146 | 11/1962 | Schoninger | 310—36 |
| 3,163,808 | 12/1964 | Peterson | 318—130 |
| 3,341,788 | 9/1967 | Nishloka | 331—113 |
| 3,356,919 | 12/1967 | Reich | 318—128 |
| 2,942,205 | 6/1960 | McShan | 318—128 XR |
| 3,156,857 | 11/1964 | Herb | 318—132 |
| 3,407,344 | 10/1968 | Bansho | 318—130 |

FOREIGN PATENTS

| | | |
|---|---|---|
| 327,359 | 3/1958 | Switzerland. |
| 921,948 | 3/1963 | Great Britain. |
| 728,771 | 2/1966 | Canada. |
| 1,157,158 | 11/1963 | Germany. |

MILTON O. HIRSHFIELD, Primary Examiner

B. A. REYNOLDS, Assistant Examiner

U.S. Cl. X.R.

58—23; 310—36; 318—130, 132, 133; 331—113, 116